Feb. 26, 1957 J. W. RINGSBY 2,783,080
TRUCK TAIL GATE ATTACHMENT
Filed April 6, 1956 2 Sheets-Sheet 1

INVENTOR.
Joe W. Ringsby
BY Whitehead, Vogl & Lowe
PER. Frank C. Lowe
ATTORNEYS

Feb. 26, 1957   J. W. RINGSBY   2,783,080
TRUCK TAIL GATE ATTACHMENT
Filed April 6, 1956   2 Sheets-Sheet 2

INVENTOR.
Joe W. Ringsby
BY Whitehead, Vogl & Lowe
PER. Frank C. Lowe
ATTORNEYS

United States Patent Office 2,783,080
Patented Feb. 26, 1957

2,783,080

TRUCK TAIL GATE ATTACHMENT

Joe W. Ringsby, Denver, Colo.

Application April 6, 1956, Serial No. 576,600

7 Claims. (Cl. 296—50)

This invention relates to semi-trailer truck tractors and more particularly to that class of semi-trailer truck tractors which have their longitudinal frame members extended to permit a dromedary freight box to be mounted upon the tractor behind the driver's cab and in front of the fifth wheel trailer connector.

The construction and loading arrangement of a semi-trailer truck tractor and the semi-trailer carried thereon involves the problems of proper wheel loading and proper arrangement of the pay load to be carried in the trailer. In the conventional arrangement, the pay load is carried in the trailer with the load being distributed between the rear tractor wheels beneath the front end of the semi-trailer and the rear trailer wheels. The weight of the tractor itself is carried largely by the front steering wheels of the tractor. Such a loading arrangement is not always the most effective, especially when the pay load is bulky, and in improved units a dromedary freight box is mounted upon a tractor to effect a further distribution of the load, provide additional load upon the front wheels, provide increased loading volume of bulky freight and to provide also an effective auxiliary box for short haul of small amounts of freight in situations where it would not be economically feasible to hitch a semi-trailer onto the tractor.

One difficult problem and drawback to the use of a dromedary freight box lies in the fact that it is not easily accessible for loading and unloading. Since the dromedary box is positioned at the center of the tractor in front of that portion of the framework supporting the fifth wheel trailer connector it is necessary to provide and install a special platform to reach the back of the dromedary box to permit the movement of freight into and out of the box. Where the loading and unloading of the box occurs at many different locations such a platform may not be available. Moreover, a platform for this purpose is heavy and is difficult for a man to handle and is not economical for a trucker to haul one along with him as additional dead weight.

With such in view, the present invention was conceived and developed, and comprises, in essence, the provision of a rear door for a dromedary box in the form of a gate which may be lowered to open the box and provide a platform over the tractor framework at the rear of the box. When the gate is lowered it is supported by and integrated with the tractor framework, all in a manner as hereinafter described in detail.

It follows that the objects of the invention are to provide a novel and improved closing gate for the dromedary box of a semi-trailer truck tractor which: (a) effects a closure at the back of the box when the gate is raised and provides an access platform extending from the back of the box to the rear of the tractor; (b) eliminates the need for special unloading platforms and the need for carrying such platforms to locations where they are not available; (c) does not materially increase the weight of the box; (d) is adapted to be extended to lie upon a loading platform when the tractor is backed against such platform; and (e) is an easily operated, economical, neat, compact, rugged and durable unit.

With the foregoing and other objects in view, all of which more fully hereinafter appear, my invention comprises certain novel constructions, combinations and arrangements of parts and elements as hereinafter described and as defined in the appended claims and illustrated in preferred embodiment in the accompanying drawing, in which:

Figure 1:
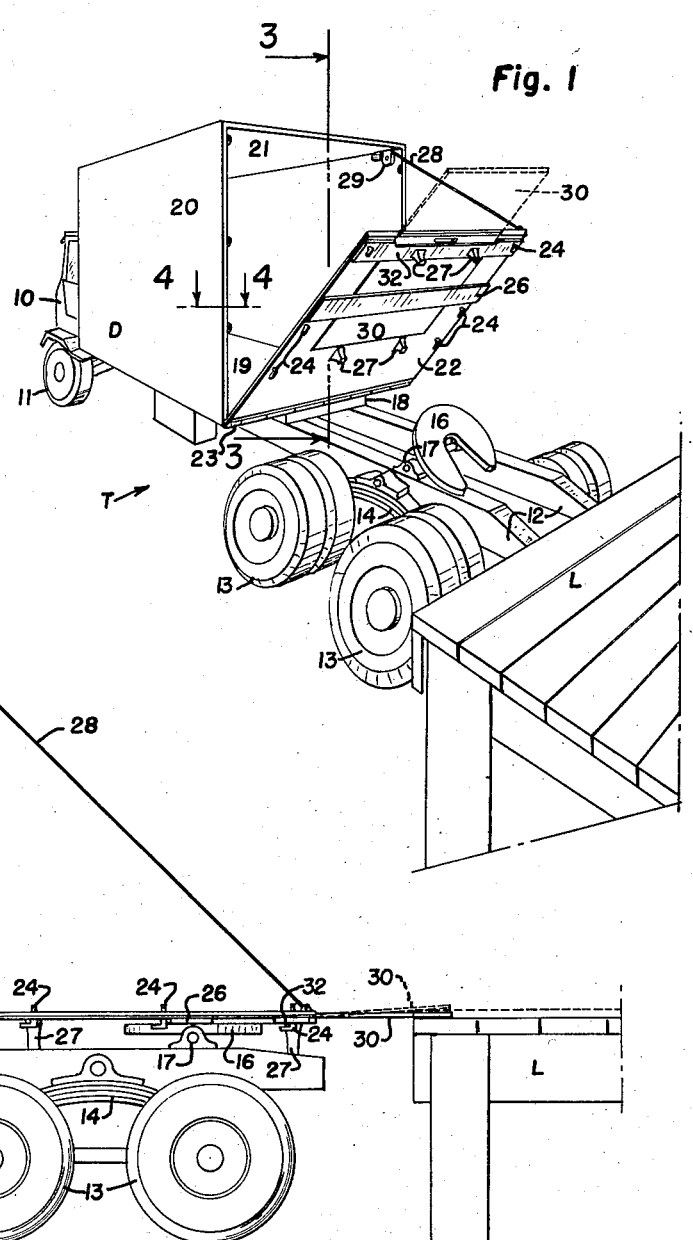
Figure 1 is a perspective rear view of a semi-trailer truck tractor carrying a dromedary box illustrating the tractor as being backed up to a loading dock and with the improved platform gate being lowered to position for use as an access platform.

Referring more particularly to the drawing, the semi-trailer truck tractor T illustrated at Fig. 1, is a conventional unit of sufficient strength to carry a dromedary box D at its center behind the driver's cab 10 at the front of the unit. This driver's cab 10 is set above the front steering wheels 11 and upon the longitudinal body frame members 12 which extend rearwardly from the cab, underneath the dromedary D and to the rear of the tractor. Two sets of drive wheels 13 are positioned at the rear of the tractor to carry the frame members 12 by springs 14 and are driven by a propeller shaft 15 which extends from the front of the tractor, all in conventional manner. In the standard units this rear portion of the frame extends approximately eight feet behind the dromedary box D to provide room for connection of a semi-trailer over the drive wheels. This connector is a disc-shaped plate commonly called a fifth wheel 16 which is rockably mounted upon a shaft 17 transversely spanning the frame members 12 to permit the fifth wheel 16 to rock to a substantially horizontal position when it is in use.

The dromedary box D is mounted upon suitable transverse sills 18 which are set across the frame members 12 to raise the floor 19 of the box to substantially the same level as the floor of a regular semi-trailer mounted upon the fifth wheel. The width and height of this box D is substantially the same as that of ordinary semi-trailers used with the tractor and such proportions are generally the maximum permitted by state laws. In general construction, this box D is formed by sidewalls 20 upstanding from the floor 19 and a roof 21. The access to the box is from the rear end which may be opened for loading and unloading the box and closed during travel.

The invention comprises, in combination with such a tractor having a dromedary box D and a substantial portion of the frame 12 extending behind the box to connect with the drive wheels 13 and carry the fifth wheel 16, a gate 22 which is swingably attached to the rear end of the box along its lower edge as by a continuous hinge 23. This hinge is placed slightly below the floor level of the box so that with the gate lowered to a horizontal position its upper surface is at the floor level of the box. This platform-gate 22 is the same size as the height and width of the box D with its edges lipped or otherwise formed in conjunction with the edges of the opening at the rear end of the box D in any suitable manner to provide an effective closure when the gate is raised. When closed the gate may be locked in position to the box walls 20 by any conventional means such as, for example, by a plurality of lock bolts 24 which are spaced along the edges of the gate. These bolts are formed with handles at the outside of the gate and with threaded shanks extending through suitable orifices in the gate to reach and be turned onto anchor brackets 25 secured to the side walls 20.

When the platform-gate 22 is lowered to a horizontal position for use as a platform it is adapted to rest upon and be supported by the fifth wheel 16 with the fifth wheel being rocked to a horizontal position. The gate 22 is preferably set above the fifth wheel a distance sufficient to permit a transverse slat 26 to be secured to its outer face at the underside of the gate when it is in the lowered position. This slat rests upon the fifth wheel and serves as a spacer reinforcing member to increase the strength of the platform-gate 22 and as a contact pad to lie against the fifth wheel since the fifth wheel is usually covered with a layer of heavy grease. If desired, the slat 26 may be formed as a channel having its face against the platform-gate 22 and having its legs outstanding from the gate with only their edges being adapted to contact the surface of the fifth wheel to minimize the pick up of grease by the slat. Knobs or buttons not shown, or any other supporting means of small contact area adapted to minimize the pick up of grease from the wheel, may be used in this connection.

It is necessary to keep this platform-gate 22 as light as possible. To accomplish this, supporting feet 27 may outstand from the outer face of the gate 22 to depend therefrom and to rest upon the tractor frame members 16 when the gate is lowered for use as a platform. One pair of feet 27 may be set between the hinge 23 and slat 26 to support that span of the gate 22 between the hinge and slat 26. A second pair of feet 27 may outstand from the upper end of the platform-gate to support the overhanging portion of the platform-gate 22 which extends beyond the slat 26.

Figure 3:
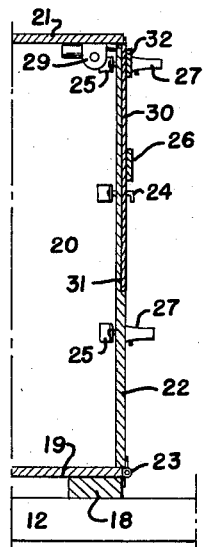
Figure 3 is a fragmentary sectional detail as viewed from the indicated line 3—3 at Fig. 1 but with the gate in its closed position.

This gate may be raised and lowered in any desirable manner, either manually or mechanically. A preferred, simple arrangement is illustrated at Figs. 1 and 3. A pull cord 28 is attached to one outer corner of the platform-gate and extends upwardly to the inside of the box D to a conventional motor-driven winding and releasing reel 29. This reel may be remotely controlled in any suitable manner, which is not shown in detail, such arrangements are well known.

Figure 2:
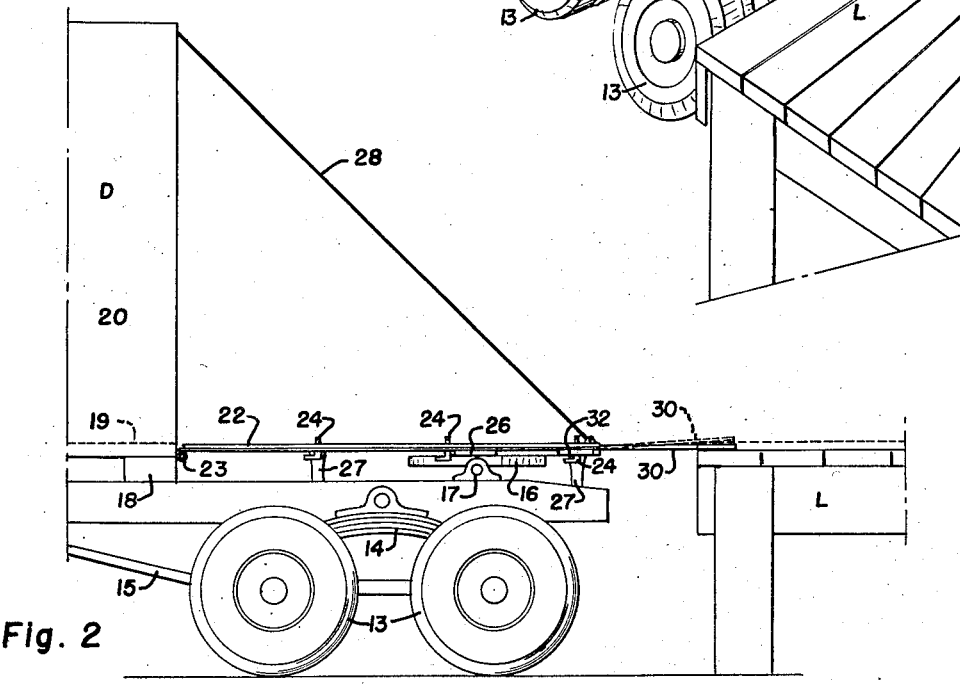
Figure 2 is a side elevation view of the rear portion of the tractor and dromedary box as backed to the loading dock and with the gate lowered and extended onto the dock as a platform between the dromedary box and the dock.
Figure 4:
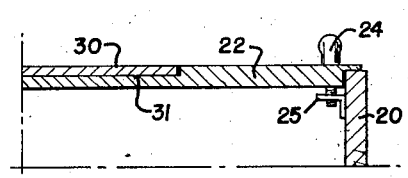
Figure 4 is an enlarged fragmentary sectional detail as viewed from the indicated line 4—4 at Fig. 1, but with the gate in its closed position.

In the usual tractor arrangement carrying a dromedary, the platform-gate 22 is somewhat shorter than the reach of the frame members 12 behind the dromedary and the platform-gate 22 cannot be abutted against a loading dock L. A plank, extra platform, or the like, may be used to lie over the gap between a loading platform and the end of the platform-gate 22 to provide a continuous way from the loading dock to the dromedary. However, in preferred construction, an auxiliary extension plate 30 is slidably mounted in a suitable pocket 31 at the outer face of the platform-gate 22 and is loosely held in position in this slot by the slat 26 and by a second transverse slat 32 at the end of the gate. A comparatively loose fit in the slat 32 is necessary to permit rotation of the auxiliary extension plate 30 when it is extended to allow for variation in the height of the loading dock L against which the truck is backed. The loading dock L may be at the same level as that of the platform-gate or may be above or below and when the auxiliary extension plate 30 is pulled out from its pocket 31 it may have to be inclined in the manner illustrated in broken lines at Fig. 2.

It is to be noted that the outer pair of feet 27 must be mounted upon the slat 32 since the extension plate is wider than the spacing of these feet.

Figure 5:
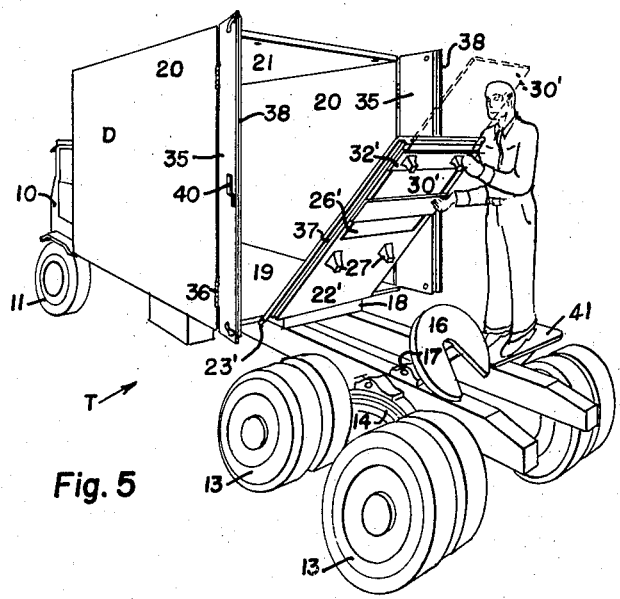
Figure 5 is a perspective rear view of a tractor carrying a dromedary box, similar to Fig. 1 but illustrating a modified construction of the platform gate which is especially adapted to be lowered and raised into position manually.
Figure 7:
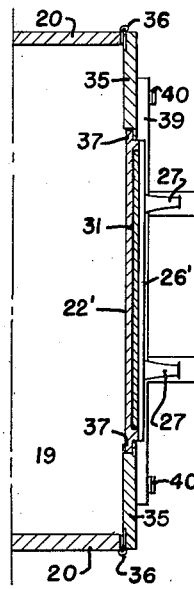
Figure 7 is a fragmentary sectional detail as viewed from the indicated line 7—7 at Fig. 6.
Figure 6:
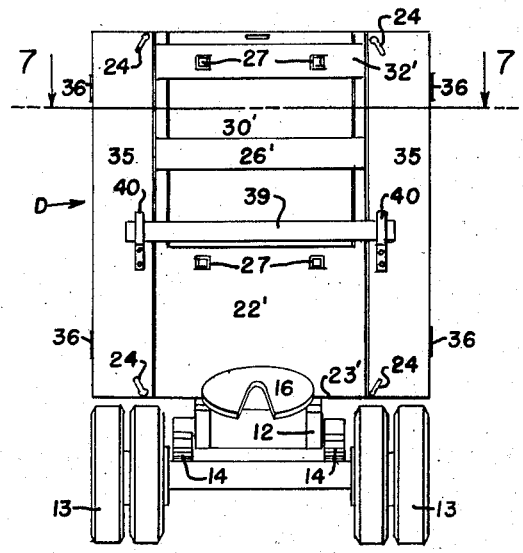
Figure 6 is a rear elevation view of the tractor illustrated at Fig. 5 but with the gate closed.

The alternate construction illustrated at Figs. 5, 6 and 7 provides a platform-gate 22' which is narrower than the width of the dromedary box D. This gate is attached to the center of the rear end of the box D at its lower edge as by hinge 23' leaving a space at each side of the box. A narrow side-gate 35 is mounted on each side wall 20 of the box D by hinges 36 at each side of the dromedary to effect a complete closure of the rear end of the box. This narrower platform-gate 22' is built substantially as hereinbefore described and includes a transverse slat 26' adapted to rest upon the fifth wheel 16 and feet 27 adapted to support sections of the gate upon the tractor frame members 12 and an auxiliary extension plate 30' slidably mounted in a pocket at the outer face of the gate and held in position by the slat 26' and an edge slat 32'. The platform gate is lipped at its edges 37 and the side-gate 35 is opposingly lipped as at edges 38. Therefore, when the platform-gate 22 is raised for closing the box the side gates 35 are then swung against the platform-gate 22' to closed position to interlock with the edges of the platform gate. The locking may be by any suitable arrangement, for example, a crossbar 39 may then be set in hooks 40 in the gates 35 to lock the rear of the box D.

This modified unit is especially adapted for being raised and lowered manually and an operator's standing platform 41 may be affixed to the bars of frame 12 to facilitate the standing of a man thereon while he is lowering the gate 22'.

While I have described my invention in detail, it is obvious that others who are skilled in the art can devise and build alternate and equivalent constructions which are within the spirit and scope of my invention; hence, I desire that my protection be limited only by the proper scope of the appended claims.

I claim:

1. In combination with a semi-trailer truck tractor having a dromedary freight box and a fifth wheel semi-trailer connector behind the freight box, a platform-gate at the rear of the dromedary box hingedly connected to the base of the box and being adapted to be swung upwardly for closure of the box and to be swung downwardly and upon the fifth wheel to extend as a platform from the rear of the box and lie over and upon said fifth wheel.

2. The combination defined in claim 1, including a transverse slat on the face of the platform-gate adapted to contact said fifth wheel when the platform-gate is lowered.

3. The combination defined in claim 1, including means on the face of the platform-gate adapted to contact the surface of said fifth wheel when the platform gate is lowered, said means having a small contact area whereby to minimize the pick up of grease normally on the fifth wheel.

4. The combination defined in claim 1, wherein said platform-gate is the full width of said box and is adapted to fully close the end of the box when swung upwardly against the box, and means for securing the platform-gate in the box-closing position.

5. The combination defined in claim 1, wherein said platform-gate is narrower than said box, and side gates at the sides of the box adapted to complete closure of the end of the box when the platform-gate is swung upwardly against the box, and means for securing the platform-gate and side gates in the box-closing position.

6. The combination defined in claim 1, wherein said platform gate includes a pocket in its face and an auxiliary extension plate normally carried within said pocket and being adapted to extend therefrom beyond the end of the gate when the gate is lowered therefrom upon the fifth wheel.

7. The combination defined in claim 1, wherein said platform-gate includes supporting feet outstanding from the underside thereof and adapted to contact tractor frame members when the platform-gate is lowered upon said fifth wheel.

References Cited in the file of this patent

UNITED STATES PATENTS

| | | |
|---|---|---|
| 2,052,867 | Cartzdafner et al. | Sept. 1, 1936 |
| 2,468,579 | Vuori | Apr. 26, 1949 |
| 2,656,196 | Fellabaum | Oct. 20, 1953 |